(12) United States Patent
Seitter et al.

(10) Patent No.: US 8,245,402 B2
(45) Date of Patent: Aug. 21, 2012

(54) METHOD FOR MANUFACTURING A SOLID HOUSING

(75) Inventors: Max Seitter, Muehlacker (DE); Juergen Graner, Sersheim (DE); Tilla Haubold, Stuttgart (DE); Stefan Oetinger, Altenkunstadt (DE)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 12/063,786

(22) PCT Filed: Aug. 17, 2006

(86) PCT No.: PCT/EP2006/065399
§ 371 (c)(1),
(2), (4) Date: Jul. 13, 2010

(87) PCT Pub. No.: WO2007/020281
PCT Pub. Date: Feb. 22, 2007

(65) Prior Publication Data
US 2010/0281691 A1 Nov. 11, 2010

(30) Foreign Application Priority Data
Aug. 19, 2005 (DE) .................. 10 2005 039 288

(51) Int. Cl.
*B21K 1/20* (2006.01)
(52) U.S. Cl. .......... 29/890.131; 29/890.12; 29/890.124; 29/890.127; 29/890.13; 29/890.126; 29/890.129; 72/365.2; 72/367.1; 72/368; 72/369; 72/370.11; 228/178; 239/88; 239/533.2
(58) Field of Classification Search .......... 29/890.124, 29/890.127, 890.131; 239/88, 533.2; 72/365.2, 72/367.1, 368, 369, 370.11; 228/178
See application file for complete search history.

(56) References Cited

U.S. PATENT DOCUMENTS 1,931,153 A * 10/1933 Mueller .................. 29/598
(Continued)

FOREIGN PATENT DOCUMENTS

| DE | 35 02 287 | 7/1986 |
|----|-----------|--------|
| DE | 195 03 736 | 8/1996 |
| DE | 42 37 405 | 10/1996 |
| EP | 0 585 782 | 3/1994 |

(Continued)

OTHER PUBLICATIONS

International Search Report, PCT International Patent Application No. PCT/EP2006/065399, dated Nov. 7, 2006.

*Primary Examiner* — Richard Chang
(74) *Attorney, Agent, or Firm* — Kenyon & Kenyon LLP

(57) ABSTRACT

The method for manufacturing a solid housing, in particular a valve housing for an electromagnetically operable valve, is characterized in that the following method steps are used: a) providing a sheet metal strip made of a magnetic or magnetizable material, b) introducing an additive into a middle area of the sheet metal strip and fusing there for forming a non-magnetizable structure, c) cutting the sheet metal strip into a sheet metal piece of desired width, d) deforming the sheet metal piece into a sleeve shape, e) mutual fastening of the cut edges now facing each other and running in the longitudinal direction of the sleeve for forming a sleeve blank, f) final machining of the sleeve blank until a desired geometry of the housing is achieved. The housing is suitable in particular for use in fuel injectors in fuel injector systems of mixture-compressing spark-ignition internal combustion engines.

15 Claims, 3 Drawing Sheets

U.S. PATENT DOCUMENTS

| | | | |
|---|---|---|---|
| 4,743,253 A * | 5/1988 | Magladry | 29/890.12 |
| 4,896,409 A | 1/1990 | Roesch et al. | |
| 5,329,196 A * | 7/1994 | Rode | 310/156.31 |
| 7,007,371 B1 * | 3/2006 | Didier et al. | 29/592.1 |
| 7,367,124 B2 * | 5/2008 | Hannewald | 29/890.12 |
| 7,877,877 B2 * | 2/2011 | Reiter | 29/890.129 |
| 2005/0231315 A1 * | 10/2005 | Sentoku | 335/302 |
| 2007/0113405 A1 | 5/2007 | Reiter | |

FOREIGN PATENT DOCUMENTS

| | | |
|---|---|---|
| JP | 11-77336 | 3/1999 |
| WO | WO 2005/061150 | 7/2005 |

* cited by examiner

METHOD FOR MANUFACTURING A SOLID HOUSING

BACKGROUND INFORMATION

The present invention is directed to a method for manufacturing a solid housing.

BACKGROUND INFORMATION

FIG. 1 shows a conventional fuel injector having a traditional three-part design of an inner metal flow guidance part and housing component at the same time. This inner valve tube is formed by an inlet connection piece forming an internal pole, a nonmagnetic intermediate part and a valve seat carrier holding the valve seat, as explained in greater detail in the description of FIG. 1.

German Published Patent Application No. 35 02 287 describes a method for manufacturing a hollow cylindrical metal housing having two magnetizable housing parts including a nonmagnetic housing zone between them, forming a magnetic isolation between the housing parts. This metal housing is premachined in one piece from a magnetizable blank down to an excess outside diameter, a ring groove being cut in the inside wall of the housing in the width of the desired middle housing zone. In the case of a rotating housing, a nonmagnetizable filler material is filled into the ring groove, while the ring groove area is heated up, and rotation of the housing is continued until the filling material solidifies. The housing is then turned on the outside down to the final dimension of the outside diameter, so that there is no longer a connection between the magnetizable housing parts. A valve housing manufactured in this way may be used, e.g., in solenoid valves for antilock brake systems (ABS) in motor vehicles.

In addition, methods for manufacturing a solid core for fuel injectors for internal combustion engines are described in German Published Patent Application No. 42 37 405 (FIG. 5 of the document). These methods are characterized in that a one-piece sleeve-shaped magnetic martensitic workpiece which is provided directly or via prior transformation processes undergoes a local heat treatment in a middle section of the magnetic martensitic workpiece to convert this middle section into a nonmagnetic, austenitic middle section. Elements forming austenite and/or ferrite molten by laser during the local heat treatment are alternatively added at the site of the heat treatment to form a nonmagnetic, austenitic middle section of the solid core.

SUMMARY

The method according to example embodiments of the present invention for manufacturing a solid housing has the advantage that housings having a magnetic isolation may be reliably mass produced in a particularly simple and inexpensive method.

Due to the simplicity of the individual components, the complexity and expenditure in terms of special tools are reduced in comparison with conventional manufacturing methods. Band material, which is easily manufacturable by rolling, may be used as the starting material for the necessary sheet metal strips. Further processing of the sheet metal pieces cut to length may also be carried out via very inexpensive sheet metal shaping processes.

If continuous sheet metal bands are used as sheet metal strips, then the manufacturing process may be configured to be inexpensive and have reduced cycle time.

It is also advantageous that great flexibility is possible in the design of the geometry of the housing itself, e.g., in the length, outside diameter and gradations.

Due to the industrial mass manufacture of the housing, the welds which are critical in the usual manufacturing technology may be optimized here for process reliability due to the good accessibility and optimizable parameters.

Advantageous refinements of and improvements on the method are possible through the measures described below.

Exemplary embodiments of the present invention are shown in simplified form in the drawings and explained in greater detail in the following description.

DETAILED DESCRIPTION

Before describing the method steps of the method for manufacturing a solid housing according to example embodiments of the present invention with reference to FIGS. 2 through 9, a conventional fuel injector will be explained in greater detail below with reference to FIG. 1 as a possible insert product for a housing manufactured according to example embodiments of the present invention.

Figure 1:
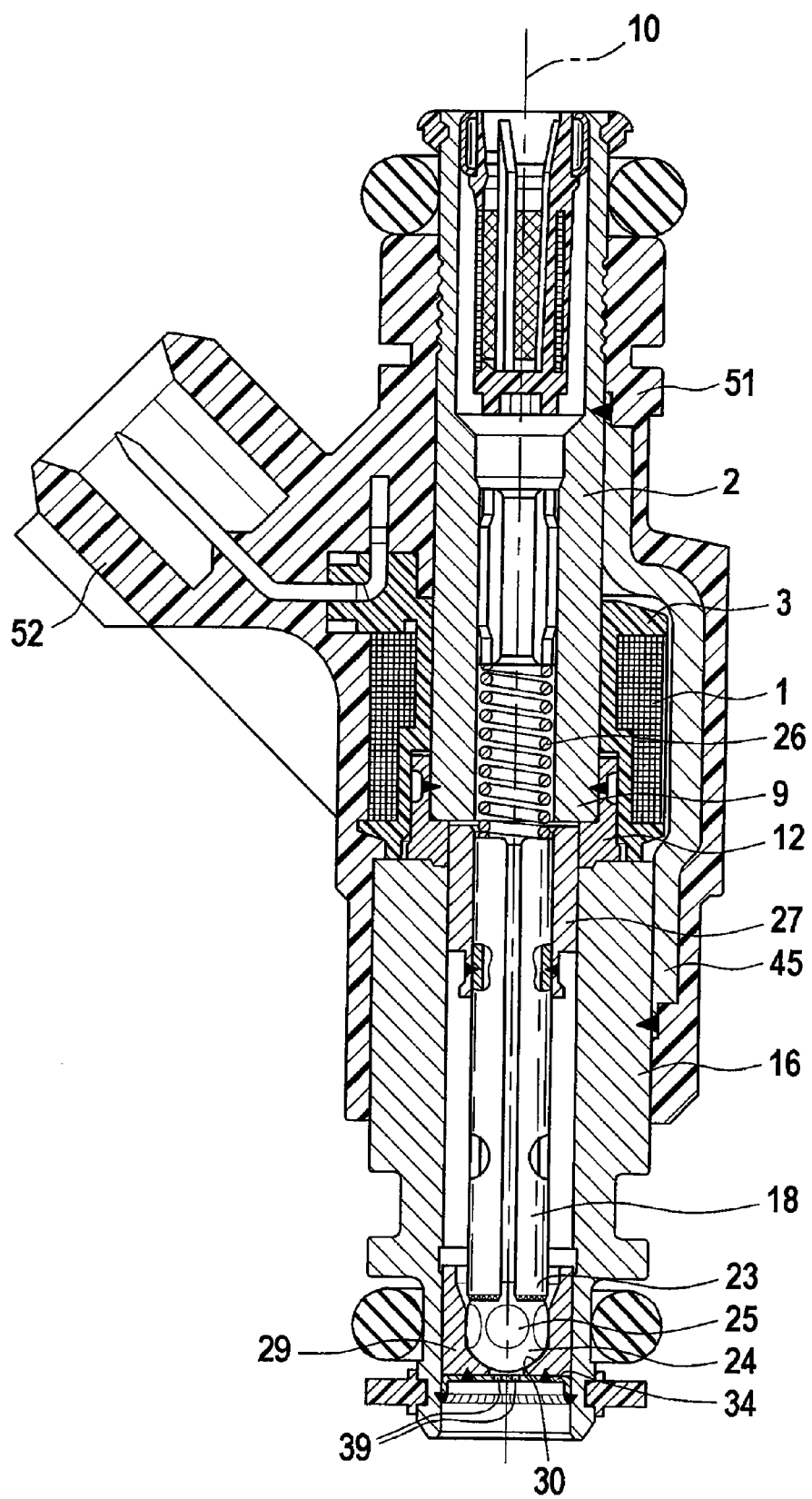
FIG. 1 shows a conventional fuel injector having a three-part inner metal valve tube as a housing, FIGS. 2 through 9 schematically show the method steps of a method according to example embodiments of the present invention for manufacturing a solid housing.
Figure 2:
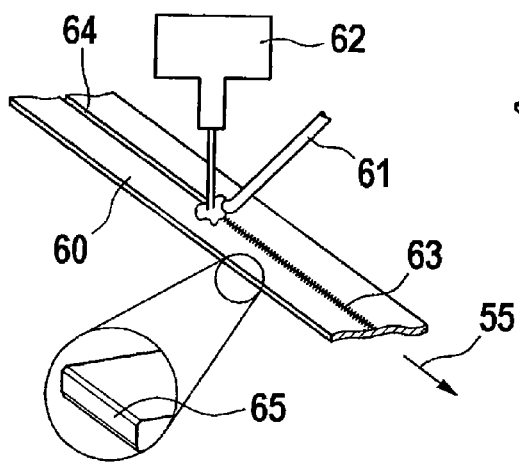

The electromagnetically operable valve as shown in FIG. 1, for example, in the form of a fuel injector for fuel injection systems of internal combustion engines operating by spark ignition of a compressed fuel-air mixture has a tubular core 2 surrounded by a magnet coil 1, functioning as the fuel inlet connection piece and internal pole. The tubular core has a constant outside diameter over its entire length, for example. A coil body 3 having steps in the radial direction receives a winding of magnet coil 1 and, in combination with core 2 permits a compact design of the fuel injector in the area of magnet coil 1.

A tubular nonmagnetic metallic intermediate part 12 is joined tightly by welding to a lower core end 9 of core 2 concentrically with a longitudinal valve axis 10 and surrounds core end 9 axially in part. A tubular valve seat carrier 16 is fixedly joined to intermediate part 12 and extends downstream from coil body 3 and intermediate part 12. An axially movable valve needle 18 is situated in valve seat carrier 16. A spherical valve closing body 24 provided on downstream end 23 of valve needle 18 has, for example, five flat areas 25 on its circumference to allow fuel to flow past it.

The fuel injector is operated electromagnetically by, e.g., a conventional method. The electromagnetic circuit having magnet coil 1, core 2 and an armature 27 is used to produce the axial movement of valve needle 18 and thus to open the valve against the spring force of a restoring spring 26 and/or for closing the fuel injector. Tubular armature 27 is fixedly joined, e.g., by a weld to one end of valve needle 18 facing away from valve closing body 24 and is aligned with core 2. A cylindrical valve seat body 29 having a fixed valve seat 30 is tightly mounted by welding into the downstream end of valve seat carrier 16 facing away from core 2.

Spherical valve closing body 24 of valve needle 18 cooperates with valve seat 30 of valve seat body 29 tapering in the form of a truncated cone in the direction of flow. On its lower end face, valve seat body 29 is fixedly and tightly joined to an spray orifice disk 34 designed in the form of a pot, for example, the joint being formed by a weld created using a laser, for example. At least one, e.g., four spray orifices 39 shaped by erosion or punching are provided in spray orifice disk 34.

To direct the magnetic flux to armature 27 for optimum operation of armature 27 when current is applied to magnet coil 1 and thus for secure and accurate opening and closing of the valve, magnet coil 1 is surrounded by at least one, for example, bow-shaped guide element 45 and functions as a ferromagnetic element, at least partially surrounding magnet coil 1 in the circumferential direction and is in contact with core 2 at one end and with valve seat carrier 16 at its other end and is joinable to them by welding, soldering and/or gluing, for example. Core 2, nonmagnetic intermediate part 12 and valve seat carrier 16, which are fixedly joined together and extend as a whole over the entire length of the fuel injector, form an inner metal valve tube as the basic structure and thus also the housing of the fuel injector. All other function groups of the valve are situated inside or around the valve tube. This arrangement of the valve tube is a classic three-part design of a housing for an electromagnetically operable unit such as a valve having two ferromagnetic, i.e., magnetizable housing areas which are isolated magnetically from one another by a nonmagnetic intermediate part 12 for effective conduction of the magnetic circuit lines in the area of armature 27 or are at least joined together by a magnetic restriction.

The fuel injector is mostly surrounded by a plastic sheathing 51 which extends starting from core 2 axially over magnet coil 1 and the at least one conducting element 45 to valve seat carrier 16, at least one conducting element 45 being completely covered axially and circumferentially. An integrally molded electric plug 52, for example, is part of this plastic sheathing 51.

Using the method steps of the method for manufacturing a solid housing according to example embodiments of the present invention as schematically indicated in FIGS. 2 through 9, it is possible in an advantageous manner to manufacture housings 66 having thin walls for a variety of purposes, preferably for electromagnetically operable valves that may replace a three-part valve tube as described above and to do so in a particularly simple and inexpensive manner.

Figure 8:
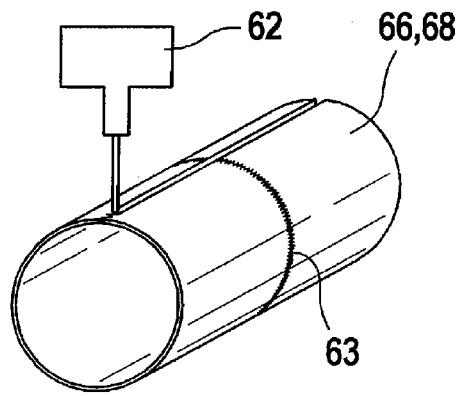

In a first method step (FIG. 2), a flat sheet metal strip 60 is provided, sheet metal strip 60 being made of a ferromagnetic and/or soft-magnetic or magnetizable material and has, for example, a ferritic or a martensitic material structure. This sheet metal strip 60 to be provided is a sheet metal section rolled flat, exactly machined, and tailor-made which is referred to as a "tailored blank." Material 1.4418 or material 1.4016, for example, may be used as the rolled base material. For a particularly effective manufacture of housing 66, sheet metal strip 60 may be provided as a flat continuous band. While sheet metal strip 60 is moved in the longitudinal direction of the band according to arrow 55, alloying of nickel, manganese, carbon, or nitrogen individually or in combination is carried out into a middle area of sheet metal strip 60 using an additional wire 61 or a powder in such quantity that a non-magnetizable structure is created. Weld-fusing of additional wire 61 or the powder for alloying the nickel or another additive is carried out by using a welding unit 62. Laser welding, electron-beam welding, plasma welding or the like may be used as methods for fusing. Instead of an additional wire 61 or an additional powder, the intended additives may be applied to sheet metal strip 60 already prior to fusing via partial coating or rolling-on. An alloy zone 63, created in the middle area of sheet metal strip 60, ultimately represents the area of magnetic separation. A longitudinal groove 64 may optionally be provided in sheet metal strip 60 in the area of alloy zone 63 so that the additive minimizes the material buildup. For example, longitudinal groove 64 may be introduced into sheet metal strip 60 prior to alloying using a profiled roller. Boundary edges 65 of sheet metal strip 60 are provided with a bevel in order to optimize subsequent welding of boundary edges 65 facing each other (FIG. 8).

Due to alloying nickel into the middle area of sheet metal strip 60, three lengthwise zones are created which each directly sequentially have different magnetic properties based on the fused materials. The two outer zones of sheet metal strip 60 have the same magnetic properties, while the middle alloy zone 63 assumes a non-magnetizable, in particular austenitic, material structure and is magnetically isolated from the two outer zones.

Figure 3:
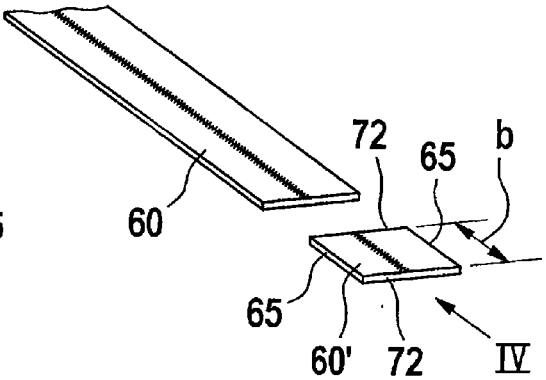
Figure 4:
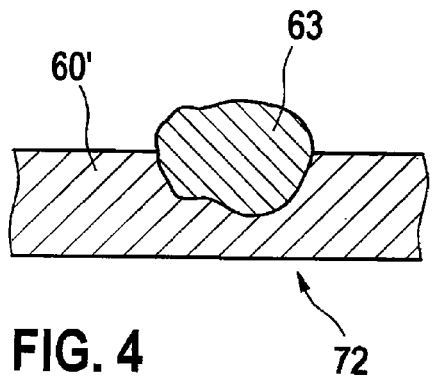

The continuous sheet metal strip 60 is subsequently cut to the desired length, thereby creating a sheet metal piece 60' whose width b ultimately corresponds to the circumference of subsequent housing 66. FIG. 3 shows a flat sheet metal piece 60' having a defined width b which, in addition to boundary edges 65, is delimited by two cut edges 72 facing each other. FIG. 4 shows a view corresponding to viewing direction IV in FIG. 3 onto a cut edge 72 of sheet metal piece 60', which makes it apparent that alloy zone 63, including the added material nickel, does not extend over the entire thickness of sheet metal piece 60', for example, but only over a partial area, over ⅔ of the thickness, for example.

Alternatively, alloy zone 63 may also extend over the entire thickness of sheet metal piece 60'. By milling or rolling a longitudinal groove 64 into sheet metal strip 60, the material buildup beyond the sheet metal thickness may also be minimized, for example.

Figure 5:
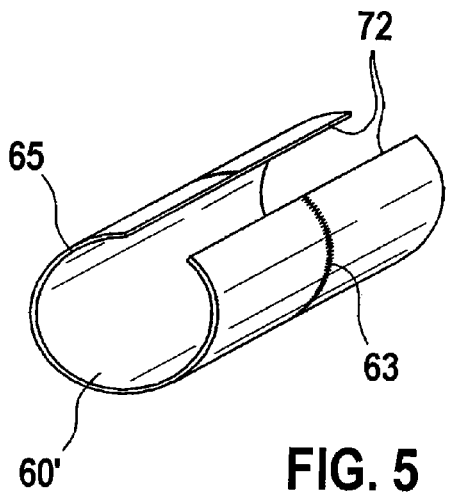
Figure 6:
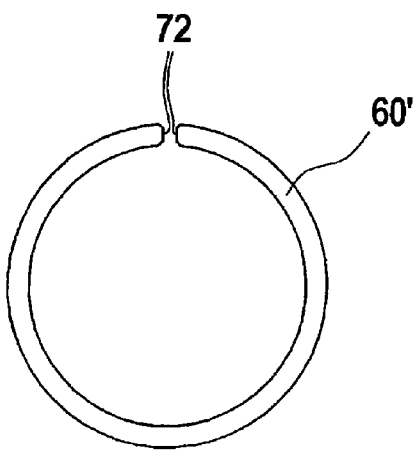

In a further processing step, sheet metal piece 60', being present in this manner, is brought into a sleeve shape by rolling or tumbling or bending namely up to a state in which the two cut edges 72, which extend over all three zones of sheet metal piece 60', are close opposite one another or are in contact. Roll-bending of sheet metal pieces 60' may take place in multiple steps. For example, an arbor-like tool is used here (FIG. 5). FIG. 6 shows a side view of sheet metal piece 60' at boundary edge 65. Similar to boundary edges 65 of sheet metal strip 60, cut edges 72 are each provided with a bevel, for example, which are applied prior to roll-bending and which are used for improved positioning of cut edges 72 opposite one another for mutual fastening.

Figure 7:
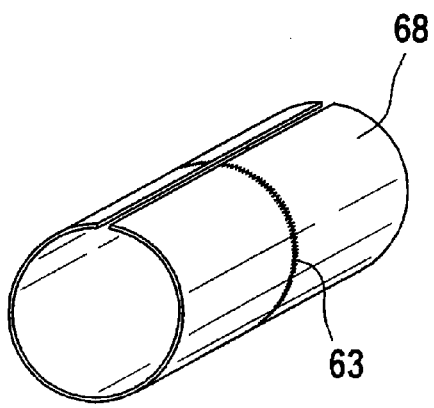
Figure 9:
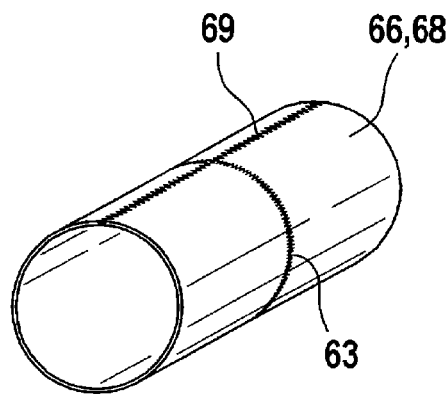

Following this method step, a sleeve blank 68 is present whose two opposite, lengthwise cut edges 72 form abutting edges at which mutual fastening takes place (FIG. 7). This joining together of cut edges 72 of the rolled or bended sheet metal piece 60' may be carried out via laser welding using a welding unit 62. In this way, sleeve blank 68 is welded longitudinally at the opposite cut edges 72 to form a closed sleeve (FIG. 8). FIG. 9 shows a housing 66 closed in the circumferential direction having three magnetic zones subsequently to rolling or bending and welding of cut edges 72 by applying a weld 69 running longitudinally.

Prior to installation of housing 66 in a valve or other assemblies, housing 66 is subjected to a finishing operation to have fixed housing 66 in a desired geometry. In the event of using a housing manufactured according to example embodiments of the present invention in a fuel injector, it may be an advantage to specifically form housing 66 using technical manufacturing measures such as ironing, tumbling, swaging, flanging and/or flaring. Housing 66 represents a component which, in a conventional fuel injector according to FIG. 1, may completely take on the functions of the valve tube made up of core 2, intermediate part 12, and valve seat carrier 16 and may thus extend over the entire length of a fuel injector.

Figure 10:
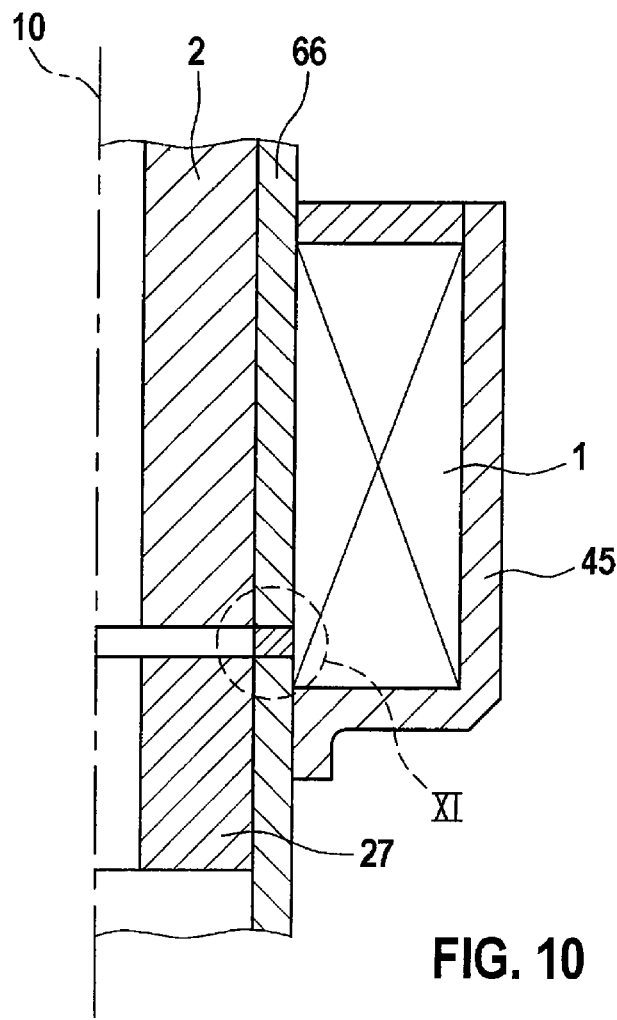
FIG. 10 shows a schematic section from an injector having a housing manufactured according to example embodiments of the present invention.
Figure 11:
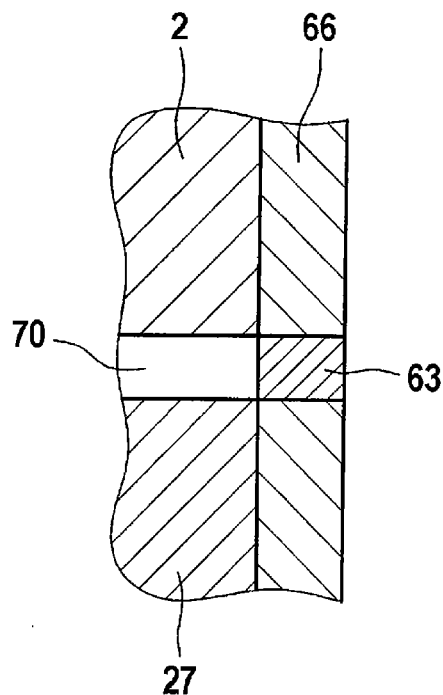
FIG. 11 shows section XI in FIG. 10 in an enlarged representation.

FIG. 10 shows a schematic section from a fuel injector having housing 66 manufactured according to example embodiments of the present invention which is installed as a thin-walled sleeve in the valve and surrounds core 2 and armature 27 radially and in the circumferential direction and is itself surrounded by magnet coil 1. FIG. 11 shows section XI in FIG. 10 in an enlarged representation. It is apparent here that the middle area of alloy zone 63 of housing 66, modified in its magnetic properties and being austenitic, for example, is situated in the axial extension area of working air gap 70 between core 2 and armature 27 in order to guide the circuit magnetic lines optimally and effectively in the magnetic circuit.

The present invention is not limited to use in fuel injectors or solenoid valves for antilock brake systems but instead it also pertains to all electromagnetically operable valves of different areas of application and in general all solid housings in units in which zones of differing magnetism are necessary in succession. Thus not only housing 66 having three successive zones may be manufactured by the method according to example embodiments of the present invention but also housings 66 having more than three zones.

What is claimed is:

1. A method for manufacturing a solid housing having at least three zones and, in each case, two directly adjacent zones have different magnetic properties, comprising:
    a) providing a sheet metal strip made of a magnetic or magnetizable material;
    b) introducing an additive into a middle area of the sheet metal strip and fusing the additive into the middle area to form a non-magnetizable structure;
    c) cutting the sheet metal strip into a sheet metal piece of desired width;
    d) deforming the sheet metal piece into a sleeve shape;
    e) mutual fastening of cut edges facing each other and extending in a longitudinal direction of the sleeve to form a sleeve blank; and
    f) final machining of the sleeve blank until a desired geometry of the housing is achieved.

2. The method according to claim 1, wherein the solid housing is arranged as a valve housing for an electromagnetically operable valve.

3. The method according to claim 1, wherein the sheet metal strip at least one of (a) is ferromagnetic, (b) is soft-magnetic, (c) has a ferritic material structure, and (d) has a martensitic material structure.

4. The method according to claim 1, wherein the sheet metal strip is provided as a rolled flat custom-tailored sheet metal section.

5. The method according to claim 1, wherein at least one of (a) nickel, (b) manganese, (c) carbon, and (d) nitrogen are introduced as additives into the sheet metal strip at least one of (a) individually and (b) in combination.

6. The method according to claim 5, wherein the additive is added as at least one of (a) a wire and (b) a powder.

7. The method according to claim 5, wherein the additive is applied to the sheet metal strip via at least one of (a) partial coating and (b) rolling-on.

8. The method according to claim 5, wherein fusing takes place via at least one of (a) laser welding, (b) electron-beam welding, and (c) plasma welding.

9. The method according to claim 8, wherein, subsequently to the fusing, an alloy zone is created which extends one of (a) over a total thickness of the sheet metal strip and (b) only partially over the thickness and which forms a non-magnetizable zone.

10. The method according to claim 1, wherein a longitudinal groove is formed in the sheet metal strip prior to introduction of the additive.

11. The method according to claim 1, wherein boundary edges and the cut edges of the sheet metal piece are provided with bevels.

12. The method according to claim 1, wherein the sheet metal piece is deformed into a sleeve shape by at least one of (a) rolling, (b) tumbling, and (c) bending.

13. The method according to claim 12, wherein the sheet metal piece is deformed in multiple steps.

14. The method according to claim 1, wherein mutual fastening of the cut edges, which are positioned opposite each other after deformation and extend in a longitudinal direction of the sleeve, is carried out via laser welding.

15. The method according to claim 1, wherein the final machining of the sleeve blank is carried out by at least one of (a) ironing, (b) tumbling, (c) swaging, (d) flanging and (e) flaring.

* * * * *